(No Model.)

A. SEAVER.
BOX TOE.

No. 559,618.　　　　　　　　Patented May 5, 1896.

WITNESSES:
H. A. Hall
A. D. Harrison

INVENTOR:
A. Seaver
by Wright Brown & Quinby
Attys.

UNITED STATES PATENT OFFICE.

AUGUSTUS SEAVER, OF BOSTON, MASSACHUSETTS.

BOX-TOE.

SPECIFICATION forming part of Letters Patent No. 559,618, dated May 5, 1896.

Application filed September 14, 1895. Serial No. 562,539. (No model.)

*To all whom it may concern:*

Be it known that I, AUGUSTUS SEAVER, of Boston, in the county of Suffolk and State of Massachusetts, have invented certain new and useful Improvements in Box-Toes for Boots and Shoes, of which the following is a specification.

This improvement has for its object to provide an improved molded box-toe adapted to be used as a substitute for box-toes made of leather and leather-board, the materials commonly used in the manufacture of articles of this character. A leather or leather-board box-toe is objectionable on account of the difficulty of molding it to the desired shape and of the difficulty of retaining the shape to which it has been molded. My improved toe is free from these objections; and it consists of a plurality of layers of textile fabric saturated with a sizing or stiffening mixture or composition and suitably molded. I find that a box-toe blank composed of cloth layers impregnated with sizing can be molded more quickly than a leather or leather-board blank, retains its shape more perfectly, and can be skived or reduced to a thin edge at its margin with as great or greater facility, the sizing material not only firmly uniting the layers, but also filling their interstices and enabling them to be readily skived.

Figure 1:
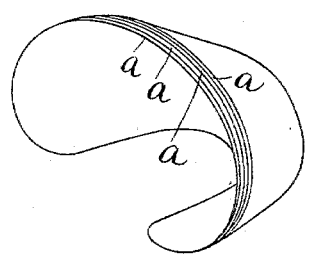
Figure 2:
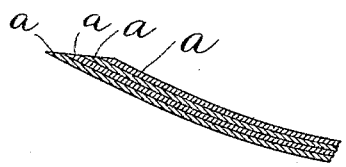

Of the accompanying drawings, forming a part of this specification, Figure 1 represents a perspective view of a molded box-toe. Fig. 2 represents a sectional view of a portion of the same considerably magnified or enlarged to show the cloth layers.

The same letters of reference indicate the same parts in both the figures.

In carrying out my invention I assemble a plurality of sheets or layers *a a a* of any suitable cloth, such as muslin, said layers being saturated with a sizing or stiffening composition which may be composed of starch or of a mixture of starch and glue, or may be of any other suitable character, the object being to secure the layers firmly together, to stiffen the fabric composed of the assembled layers, and to fill the interstices of the layers so that they can be freely cut with a skiving-tool. The layers may be cut out in the form of a box-toe blank before being assembled and saturated, or they may be composed of large sheets from which the box-toe blanks may be cut by means of dies after the sheets have been assembled and saturated. The blank is then subjected to the action of molding-dies while it is in temper, or, in other words, sufficiently damp to soften the sizing material. I find that the blank when in this condition readily receives and retains the shape of the dies and does not lose said shape when removed from the dies, it being unnecessary to leave the molded article in the dies while it is drying. Hence the box-toes can be rapidly molded and then stored away to dry. The blank is preferably skived to reduce its margin to a thin edge before it is molded, and while in a dry condition the stiffening material or sizing enabling the cloth layers to be cut by a skiving-tool without yielding or being pressed back thereby. It will be seen that a box-toe of any desired thickness may be thus produced, as any desired number of layers may be employed.

I claim—

A box-toe composed of a plurality of layers of textile fabric impregnated with stiffening material and molded to the desired shape, the said stiffening material uniting the layers making permanent the shape imparted to the layers, and enabling their outer edges to be skived.

In testimony whereof I have signed my name to this specification, in the presence of two subscribing witnesses, this 7th day of September, A. D. 1895.

AUGUSTUS SEAVER.

Witnesses:
A. D. HARRISON,
W. P. ABELL.